Nov. 17, 1925.  1,561,537

F. A. HAYES

LOAD LIMITING DEVICE

Filed July 2, 1923

INVENTOR
Frank A. Hayes
BY
Werner F. Rothermund
ATTORNEY

Patented Nov. 17, 1925.

1,561,537

UNITED STATES PATENT OFFICE.

FRANK A. HAYES, OF KEYPORT, NEW JERSEY, ASSIGNOR TO AEROMARINE PLANE & MOTOR COMPANY, A CORPORATION OF NEW YORK.

LOAD-LIMITING DEVICE.

Application filed July 2, 1923. Serial No. 649,089.

*To all whom it may concern:*

Be it known that I, FRANK A. HAYES, a citizen of the United States, and a resident of Keyport, in the county of Monmouth and State of New Jersey, have invented certain new and useful Improvements in Load-Limiting Devices, of which the following is a specification, reference being had to the accompanying drawings, forming part of this specification.

This invention relates to load limiting devices in general and is of the class that transmit a predetermined driving load and wherein the driving means is released to the extent that the load exceeds the predetermined amount.

The load limiting device herein disclosed is shown and described in connection with an internal combustion engine starting mechanism in which a device of this kind has been found necessary, it will be understood, however, that the invention is not restricted in its application to a mechanism of the kind shown in conjunction therewith in this instance, it being obvious that the device can be used to advantage in other forms of drives where load limiting means are desirable.

In the prior art various forms of spring applied friction clutches have been used, most of which are open to the objection that the torque or load at which the clutch slips is determined by the spring pressure applied and by the coefficient of friction at the friction faces. This coefficient depends on the condition of the surfaces as to lubrication, temperature, wear, etc., and as a result may vary over a very large range. Further, the coefficient of friction at rest, or in other words, the break-away friction, is very different in an ordinary clutch from the friction when slipping.

The present disclosure features an improved construction wherein no joints or sliding surfaces that have a tendency to produce undesirable friction are interposed between the spring and the friction faces actuated thereby. This result is achieved by using a coiled band as one of the friction elements, said coiled band being maintained in frictional contact with a driven drum by means of springs, which are so disposed as to be the means whereby the coil receives its torque from the driving source.

An object of the invention is to provide a simple and effective device which is adapted to prevent the transmission of an overload, by yielding when a predetermined driving load is exceeded.

Another object of this invention is to provide a novel and improved friction clutch in which the torque at which the slippage occurs is relatively independent of the condition of the slipping surfaces as to coefficient of friction.

A further object of this invention is to provide an improved friction clutch of the kind specified in which provision is made for readily adjusting the amount of friction applied.

In the drawings:—

Figure 2:
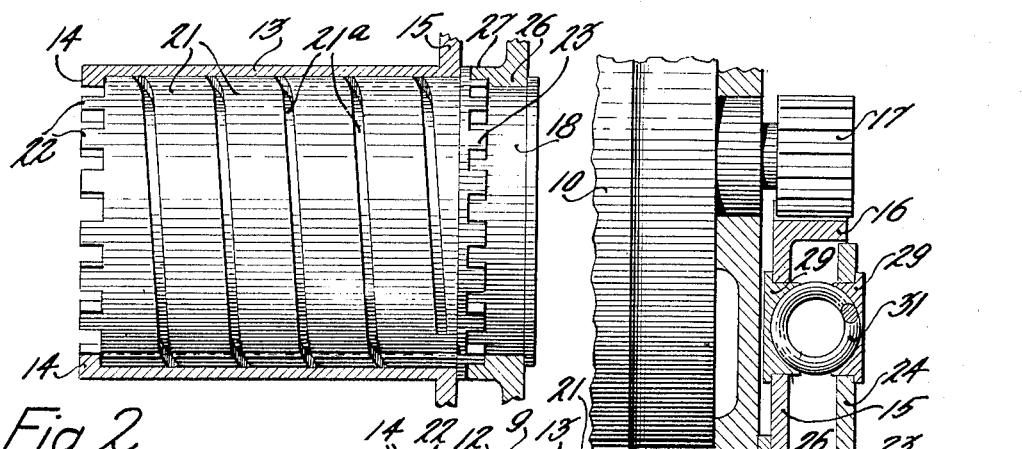
Figure 2 is a fragmentary detail view of the friction engaging means shown in Fig. 1.

In the present instance 9 designates a housing secured to an internal combustion engine in any suitable manner. The housing is designed to afford a support for an electric starting motor 10 and is provided with a front wall portion 11.

Within a bearing 12, formed in the housing 9, there is supported for free rotation, a cylindrical member 13, having a multiplicity of inwardly projecting teeth or splines 14, circumferentially spaced apart. Integral with the cylindrical member 13 there is formed a web 15 the outer peripheral portion of which is formed into a ring gear 16, said ring gear meshing with the pinion 17 forming a drive therefor.

A drum 18 constituting the driven member contains a pinion shifting mechanism in which an axially shiftable pinion 20 is shifted into mesh with a large gear 19 suitably connected to an engine to start the same. Any suitable pinion shifting mechanism can be employed in place of the one shown, this not being in itself a feature of this invention. Furthermore, in certain classes of drives a fixed or constantly meshed pinion will be found preferable.

Upon the drum 18 there is mounted a helically formed friction band 21 having at one end a series of splines 22 similar to the splines 14 and adapted to interlock therewith. At the other end of the friction band 21 there are formed a series of splines 23, the ones provided at this end of the friction band being preferably different in number from those provided at the end opposed thereto; the purpose of which will be more fully described hereinafter.

The friction band 21 is preferably formed integral with the teeth or splines thereon and can conveniently be constructed as a cylinder with a helical slot 21ª, cut therein forming the coil band as shown in Fig. 2. In this manner a more accurate fit can be provided between the friction band and the drum 18 than could be obtained by winding a band to form the coil.

A disk member 24 having a hub portion 26 is mounted for free rotation on the drum 18 and disposed adjacent to the web 15. The hub portion 26 is provided with a series of splines 27 adapted to interlock with those, designated by 23, of the friction band 21.

Figure 3:
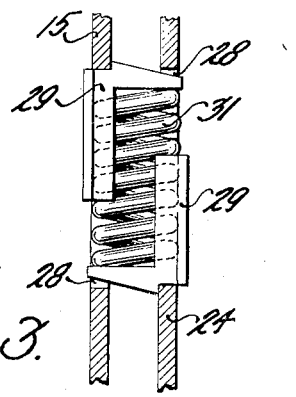
Figure 3 is a fragmentary view of the spring control shown in Fig. 1.

In the web 15 and in the disk 24 there are formed a plurality of openings 28 (Fig. 3) the openings of the web being substantially in alignment with the openings of the disk in assembled relation. In each one of these openings there is secured a spring retainer, 29, these retainers being disposed in their respective openings in a manner so that they will be in a position opposed to one another so as to provide for the reception of the compression springs 31 between adjacent retainers, said springs being introduced into the mechanism under some initial compression so as to wind up the friction band on the drum and to maintain sufficient tension thereon to frictionally engage and drive the drum. The springs 31 which generate this friction are so disposed as to tend to advance the disk 24 relative to the web 15 whereby a winding up or tightening action is imposed on the band 21 by virtue of the connection of its free end to the cylindrical member 13, this connection being made by the splines 14, 22. It will be seen that this last mentioned connection does not transmit the driving torque, but that it takes the reaction due to the winding up action of the springs on the band 21. Torque is transmitted from the disk 24 to the band 21 through the splines 23, 27.

It is a characteristic of a band such as that shown and described, that a very small winding up tendency between its ends results in a relatively great driving friction. It will be seen that in addition to exerting the winding up action on the band, the springs function as the only means of torque transmission from the web 15 to the disk 24. Only a small proportion of the pressure exerted by the springs is used to maintain adequate frictional contact of the band 21 on the drum 18 by the winding up action, the bulk of the pressure of said springs being employed in transmitting the torque. It is a requisite in devices of this kind that in order to obtain good calibration only a small proportion of the force exerted by the springs be used to generate adequate frictional contact between the driving and the driven means.

Provision is made for adjusting the releasing torque of the device by adjusting the pressure of the springs 31, by means of the interlocked splines at either end of the coil. It will be understood that if these splines are disengaged and moved relatively to each other in one or the other direction, the relative angular positions of web 15 and disk 24 can thus be altered to give any desired spring pressure within the range of the device. Furthermore by making the splines at either end of the coil slightly different in number as previously described, a differential adjustment is obtained which is very fine. This method of adjustment will be readily understood by those skilled in the art.

Figure 1:
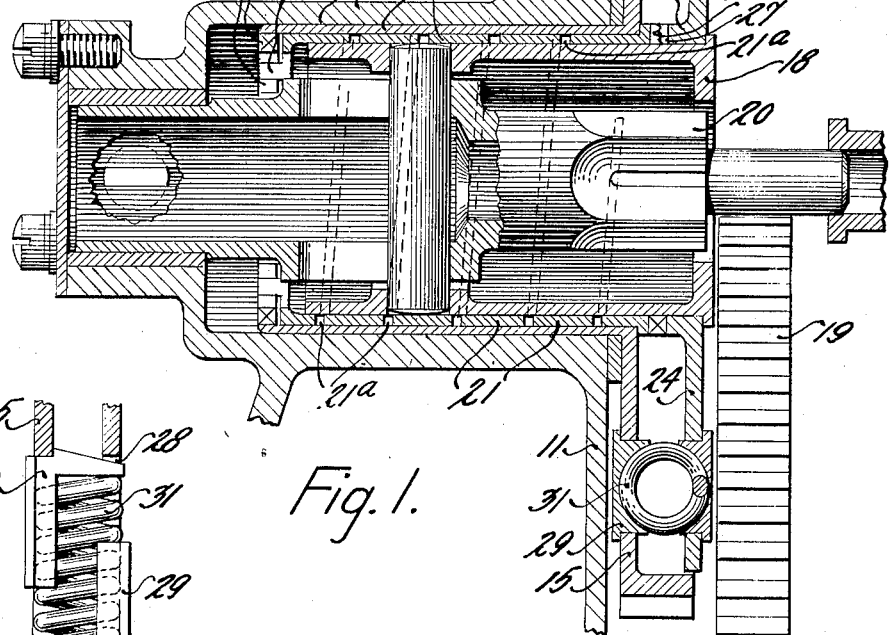
Figure 1 is a fragmentary vertical section of an engine starting mechanism showing my invention as applied thereto.

In operation and assuming the elements in the positions shown in Fig. 1, power is applied to the ring gear 16 by means of the pinion 17, said power being transmitted by the springs 31 from the web 15, to the disk 24, the disk 24 transmitting torque to the drum 18 by means of the friction band 21 which is normally engaging the drum due to the winding up action generated by the driving springs 31. As the drum is rotated the pinion 20 may be automatically shifted into engagement with the gear 19 and the torque transmitted to the engine for starting purposes.

The action of the releasing device is as follows:

At no load, springs 31 exert torque on the driving member in opposition to the direction of the drum 18, which is exactly balanced by the tension in the friction band acting on splines 14. As the load comes on, the springs 31 deflect very slightly thus reducing the tension in the band, the difference between the torque due to the springs and that due to the tension in the band being at all times equal to the net torque transmitted by the device and hereinafter designated as the load. This action continues with increasing load until the tension in the band is just sufficient to produce the frictional engagement required to equal the load. Any tendency to increase the load beyond this will immediately cause the band to slip. The load at which this occurs is therefore the releasing load and the device will continue to transmit this load, but no more, as long as the torque required to drive the driven member is greater than this load.

The driven member, meanwhile, may come to rest or reverse or operate at some speed slower than that of the driving member depending upon the speed-load characteristic of the driven member, but the driving member will continue to operate at its speed corresponding to the releasing load. As soon as the load drops below the releasing load the band exerts more torque on the drum than required to meet the load and the drum will be accelerated until slippage ceases.

Since only a small percentage of the pressure of the driving springs 31 is required to provide the necessary frictional engagement, the device will release at a torque only slightly below the driving torque corresponding to the pressure of these springs.

It will be understood that when an overload occurs, such as a backfire in the engine, the engine shaft is suddenly and violently reversed, this reversed torque of the shaft cannot be transmitted by a mechanism of this construction as the springs 31 are instantly deflected thereby causing the friction band to release the drum as hereinbefore described.

Figure 4:
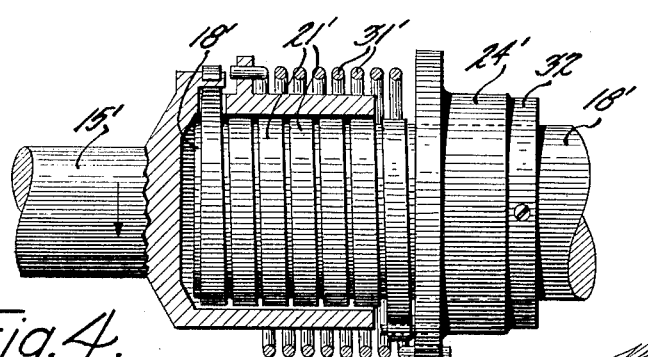
Figure 4 is a fragmentary view partly in section showing a modification of the form shown in Figs. 1 and 2.

With reference to Fig. 4, the numerals therein corresponding with those of Fig. 1 with an appended exponent, there is shown a modification of the form in Fig. 1, employing the same principle in a more simple manner. In this view 15′ designates the driving member, 18′ the driven drum, 24′ a floating member mounted on the drum and held against end motion by a collar 32. The friction band 21′ is secured to the driving member and the floating member and, as shown in this form, a torsion spring 31′ is employed to produce the winding up action of the friction band, said spring being connected to the driving member and the floating member as shown and under sufficient tension to cause the friction band to engage the drum.

In the drawings the springs 31 are shown as a means for contracting the coil on the drum. It is possible however, to so proportion the coil that it will of its own elasticity exert the necessary frictional driving contact against the drum, also it is obvious that the coil can conveniently be disposed within, instead of outside of the drum to effect frictional engagement therewith.

Further variations may be resorted to within the scope of the invention and portions of the improvements may be used without the others, whilst not departing from the spirit of the invention.

Having thus described my invention, I claim:—

1. In a load limiting device, the combination of a helix wound for frictional driving engagement upon a drum to be driven, a power transmitting spring means, said frictional engagement subject to the power transmitting spring means, and means connecting the spring means to the helix to cause said helix to release the drum upon a yielding of said spring means.

2. In a load limiting device, a clutch comprising a driven drum, a coil band arranged for frictional engagement with said drum, a driving member, and spring means adapted to transmit a predetermined driving torque from the driving member to one end of the coil and to maintain the coil in frictional contact with the aforesaid driven drum until the torque transmitted exceeds the capacity of said spring means.

3. In apparatus of the class described, the combination of a helical friction member, a driven drum frictionally engaged by the friction member, a driving means, a spring means interposed between the driving means and the friction member to transmit a driving torque there between and adapted to maintain a frictional contact of the friction member with the drum, and means connecting the spring means to the helical member so constituted as to effect a release of the friction member from the drum when said spring means is deflected.

4. In apparatus of the class described, the combination of a driving means, a resilient friction coil, a drum frictionally engaged by the friction coil, a spring means adapted by initial compression to impose friction producing pressure of the friction member on the drum, said spring means also adapted to transmit the load from the driving means to the friction member in a manner so that the effect of an increase in the load transmitted will reduce the friction producing pressure of the friction member on the drum.

5. In a load limiting device, the combination of a driven drum, a helix wound thereon, a spring means adapted to transmit a predetermined load to said helix and to maintain the helix in frictional driving contact with the drum, said spring means further adapted to be deflected by a load in excess of a predetermined amount to cause a release of the helix from the drum.

6. In a load limiting device, the combination of a drum, a helix wound thereon, members adjustably secured to each end of the helix, said members mounted for relative rotation to each other, a spring means disposed between said members tending to wind the helix on the drum, said spring means also adapted to transmit a driving load and to be deflected by an excessive load to cause an unwinding action of the helix.

7. In apparatus of the class described, the combination of a driving means, a driven drum, a floating member on the drum, a helical friction member wound on the drum, one end of the helical friction member being connected to the driving means and the other end connected to the floating member, a spring means connected to the driving means and to the floating member and adapted to transmit power therebetween, said spring means further adapted to normally wind the friction member on the drum and to cause an unwinding action thereof when the spring means is deflected.

8. In a control means for a load transmitting device, the combination of, a driven member, a friction clutch comprising a constrictable member adapted to engage the driven member, and a load transmitting spring means connected to one end of the constrictable member and adapted to produce an engagement thereof with the driven member and to automatically release the same when the load exceeds the spring power.

9. A power transmitting device including, a spring means, a helix, and a drum, wherein the load is transmitted through spring means, said spring means also producing frictional engagement of the helix on the drum to drive the same, the whole so constituted that a deflection of the spring means by the load will relieve the frictional engagement of the helix.

10. In apparatus for yielding under an excessive driving load, in combination, a spring means, a drum, a constrictable friction member, said spring means under initial tension adapted to transmit a driving load to the drum by means of the friction member which is mounted for engagement with the drum, said spring means being adapted to yield under excessive load to permit a slippage of the friction member.

11. In an engine starting mechanism, in combination, a driving means, a drum adapted to receive and operate a pinion shifting and driving mechanism, a helical driving member adapted to frictionally engage and drive the drum, and a preset spring means adapted to transmit torque and to normally act on the helical driving member to contract the same on the drum for driving engagement therewith, said spring means also adapted to be deflected by an overload so as to cause an expansion of said helical member and a release of the drum.

12. In apparatus of the class described, in combination, a first member mounted for rotation in a bearing and driven from a source of power, a second member mounted for relative rotation to the first member, a spring means under initial deflection adapted to transmit power from the first to the second said member, a helix, one end of the helix connected to the first said member and the other end connected to the second said member, a drum mounted for rotation within the helix and adapted to be frictionally engaged thereby due to the initial deflection of the spring means, the drum connected to a load to be driven, the whole so constituted that a load in excess of the capacity of said spring means will cause relative motion of the two said members in a manner as to release the frictional engagement of the helix with the drum.

13. In an engine starting mechanism having load limiting features, in combination, a driven drum adapted for connection with an engine to be started, a helix wound on the drum for frictional driving engagement therewith, a preset torque transmitting spring having connection with the helix and responsive to an overload, said frictional engagement subject to the torque transmitting spring to cause said helix to release the drum, when the spring is deflected.

14. In a device of the class described, in combination, a bearing, a pair of members mounted for rotation in said bearing, one of said members adapted for relative motion to the other, a spring means therebetween adapted to transmit power from one member to the other, a drum, a helical member wound on the drum, one end of the helical member secured to one of said members and the opposed end secured to the other of said members, the spring means tending to wind the helix on the drum for frictional driving engagement therewith, said spring means also adapted to respond to an overload to cause said helix to release the drum.

15. In apparatus of the class described, the combination of a drum, a constrictable friction member on the drum, a gear member driven from a source of power, engaging means on said gear member adapted to engage one end of the friction member, a disk member mounted for rotation on the drum, engaging means on said disk member adapted to engage the other end of the friction member, spring means under initial compression so disposed between the gear member and the disk member as to normally contract the friction member on the drum, said spring means further adapted to transmit power from the gear member to the disk member, means for adjusting the initial compression of the spring means so as to reduce or increase the frictional pressure of the member on the drum, and a bearing in which the whole is rotatably supported.

16. In apparatus of the class described, the combination of a coiled band and a spring means, the coiled band constituting a friction element between a driving and a driven means, said coiled band being maintained in frictional contact with the driven means by the spring means which are so disposed as to be the medium whereby the coil band receives its torque from the driving means.

17. In a load limiting device for a starter gear train, the combination of, a frictionally engaged load limiting means forming a driving connection in said gear train and comprising a constrictable friction element, a member engaged by the constrictable element and a preset torque transmitting spring means having connection with the constrictable element and controlling the frictional engaging action of said element in a manner as to permit slipping when the spring is deflected.

18. In a load limiting device, the combination of, a power means, a train of gears driven from the power means, a frictionally engaged load limiting means comprising a constrictable member having one end connected to a gear in said train, an element frictionally engaged by the constrictable member, an operating means connected to the other end of the constrictable member and having motion relative to said gear, and a preset load spring means between the gear and said operating means to control the frictional engagement aforesaid in a manner as to permit slipping when the spring is deflected.

19. The combination with an engine a starter and a gear train, of a preset spring means incorporated in the gear train and adapted to transmit without deflection a predetermined torque load, a constrictable frictional driving means, a drum engaged and normally driven thereby, said spring means connected to the constrictable means so as to cause a cessation of the engaging action thereof when the spring is deflected.

Signed at Keyport in the county of Monmouth and State of New Jersey this 27th day of June A. D. 1923.

FRANK A. HAYES.